Nov. 26, 1946.　　A. CALLESON ET AL　　2,411,503
CUPPING PRESS
Filed Jan. 3, 1941　　15 Sheets-Sheet 4

Inventors
Amos Calleson &
Edgar A. Calleson
By Cushman Darby & Cushman
Attorneys

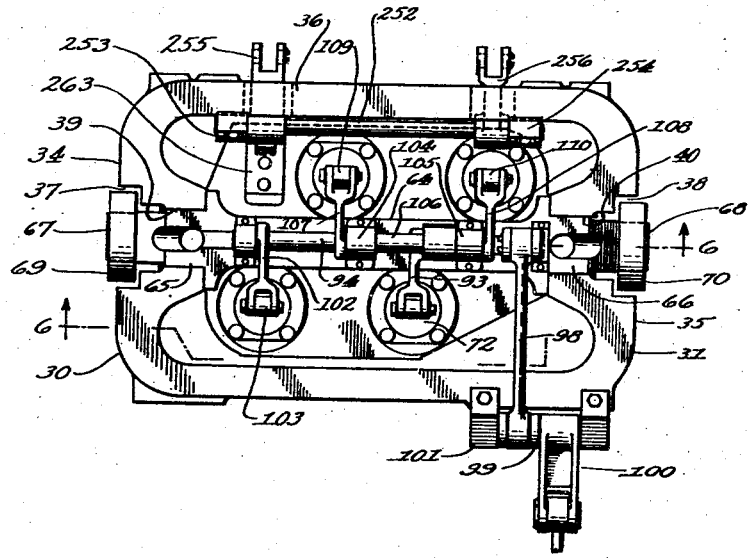

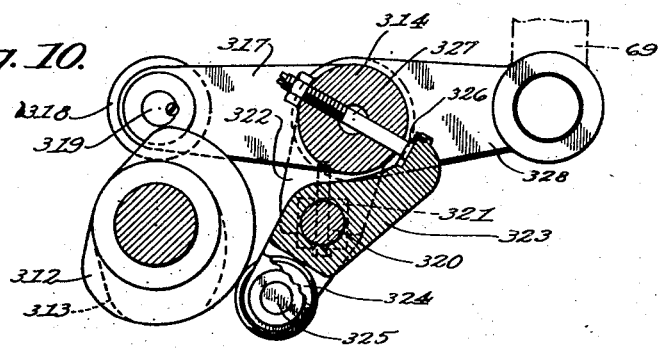
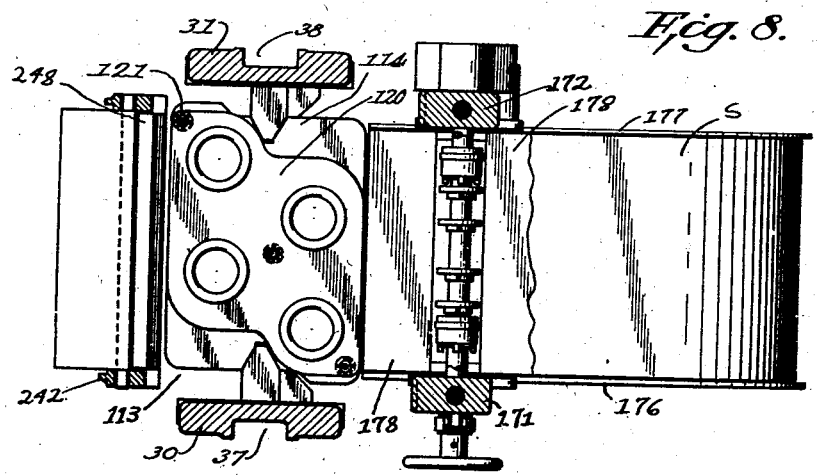
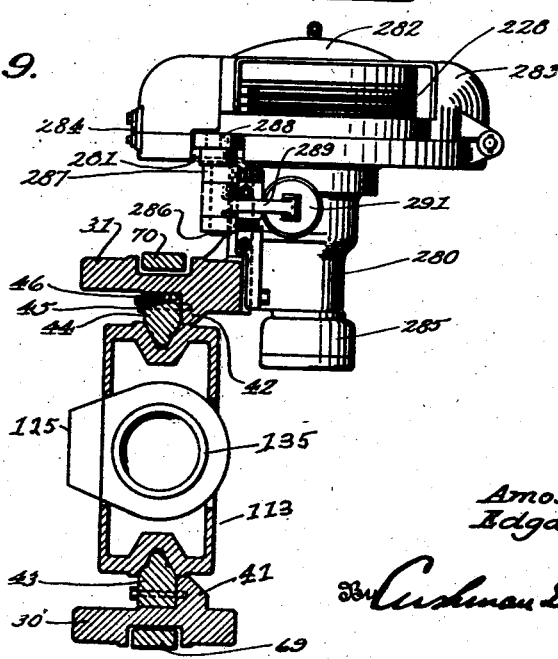

Nov. 26, 1946  A. CALLESON ET AL  2,411,503
CUPPING PRESS
Filed Jan. 3, 1941  15 Sheets-Sheet 7
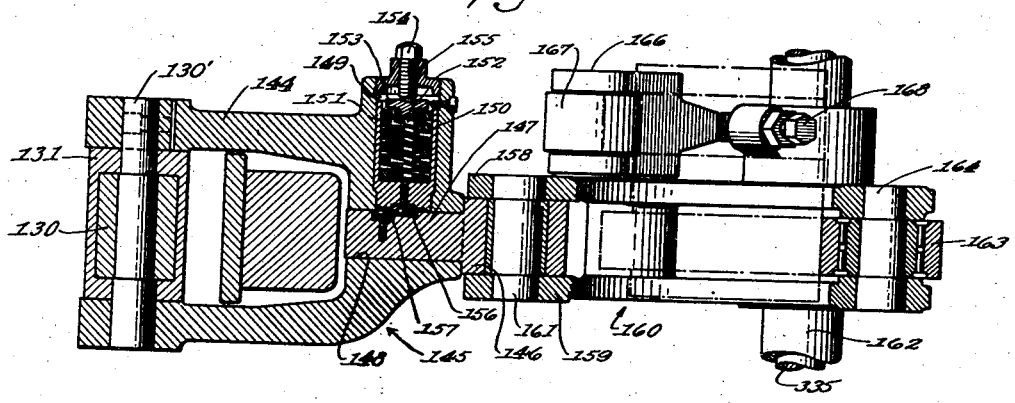
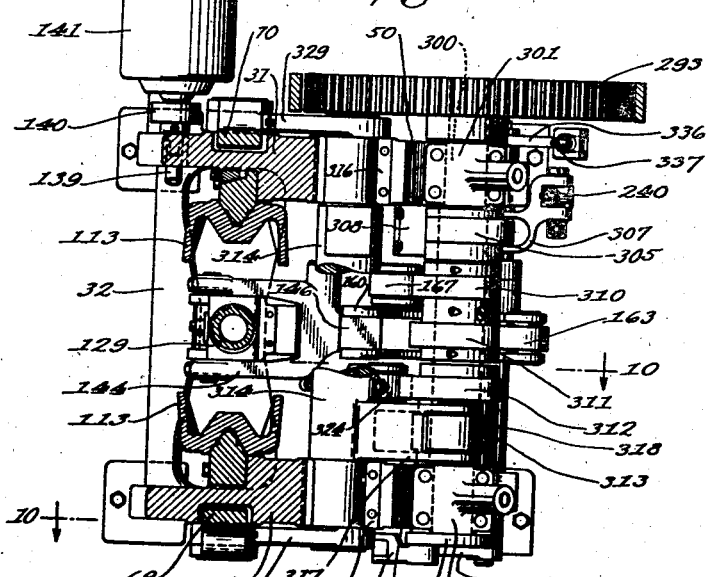
Inventors
Amos Calleson &
Edgar A. Calleson

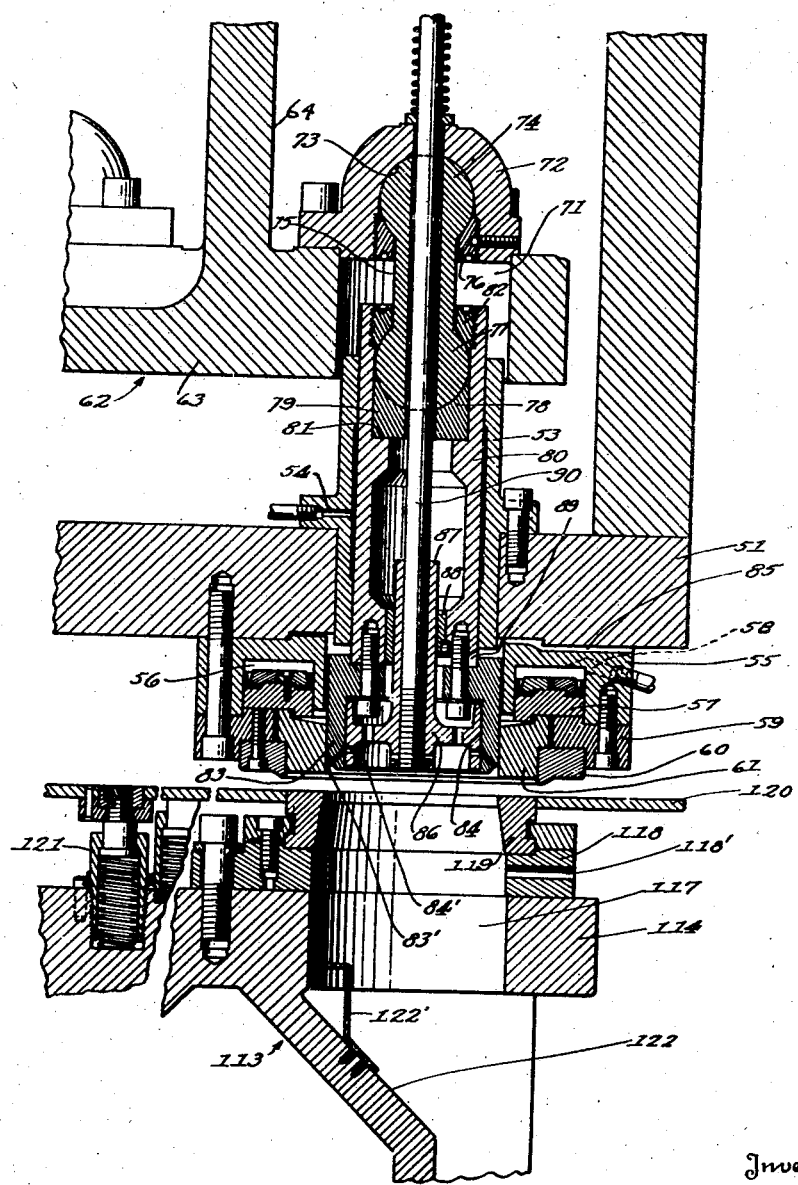

Nov. 26, 1946.  A. CALLESON ET AL  2,411,503
CUPPING PRESS
Filed Jan. 3, 1941   15 Sheets-Sheet 9

Inventors
Amos Calleson &
Edgar A. Calleson
By Cushman Darby Cushman
Attorneys

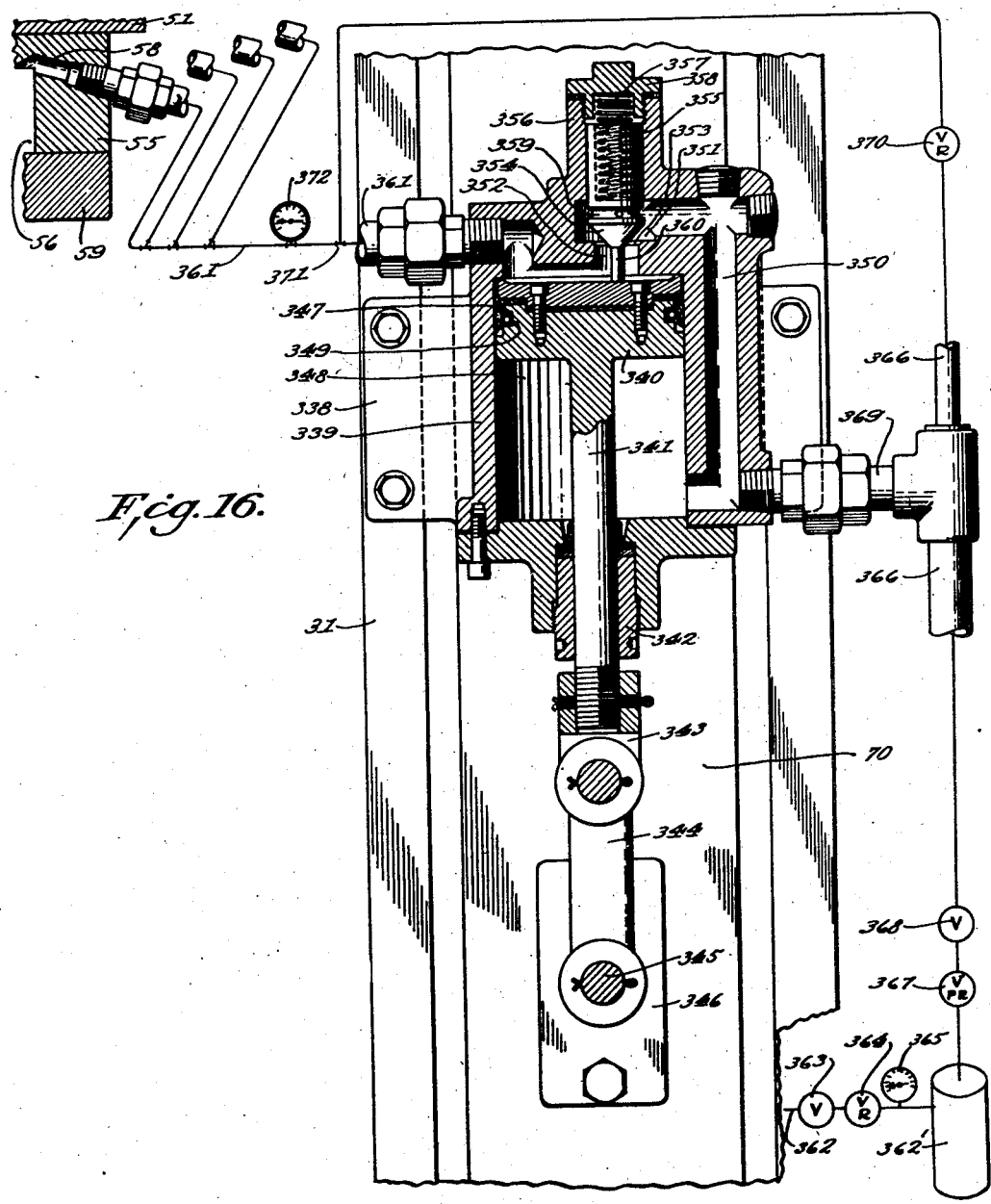

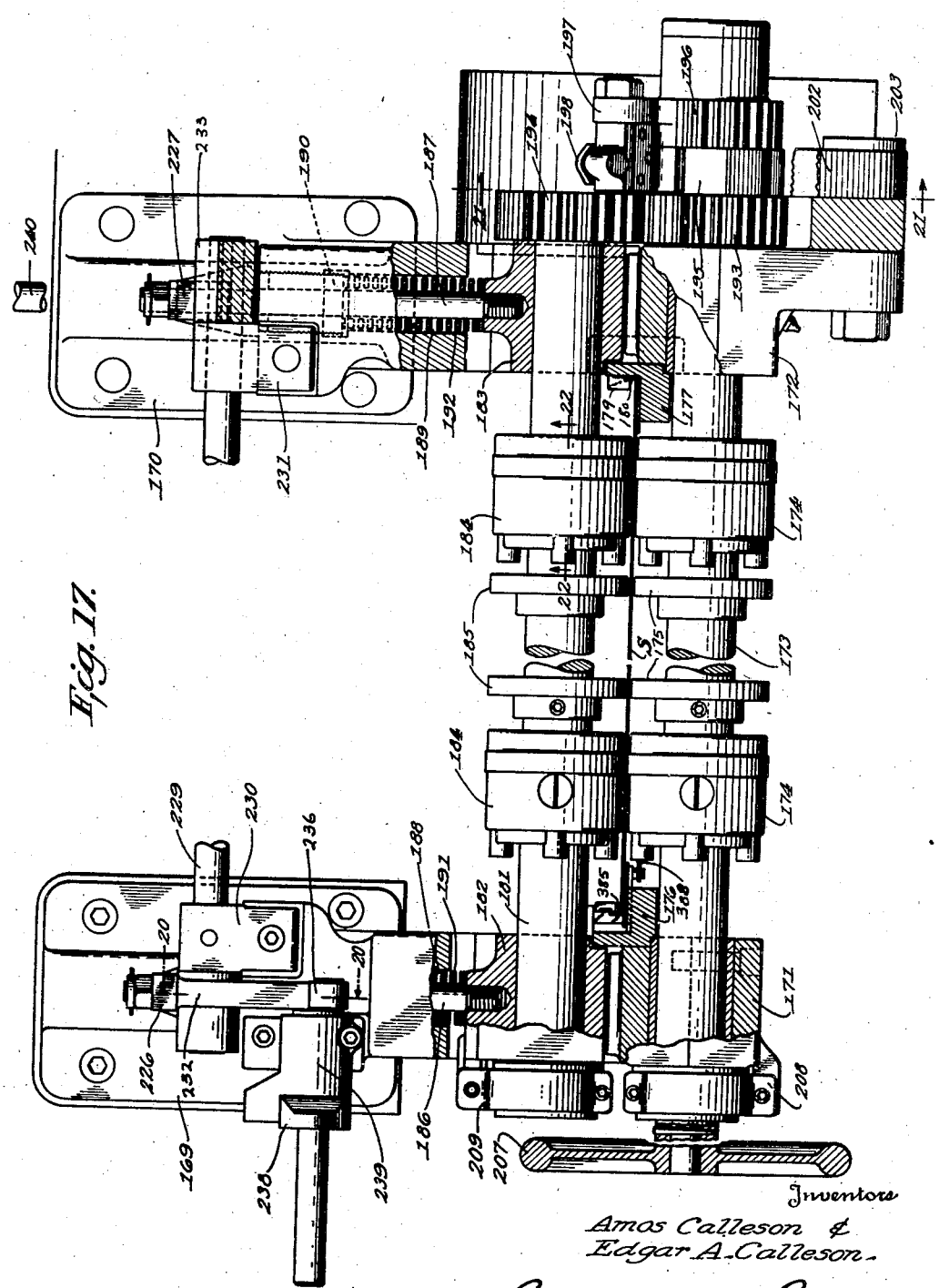

Nov. 26, 1946.  A. CALLESON ET AL  2,411,503
CUPPING PRESS
Filed Jan. 3, 1941  15 Sheets-Sheet 12

Inventors
Amos Calleson &
Edgar A. Calleson
By Cushman Darby & Cushman
Attorneys Nov. 26, 1946.　　A. CALLESON ET AL　　2,411,503
CUPPING PRESS
Filed Jan. 3, 1941　　15 Sheets-Sheet 13

Inventors
Amos Calleson &
Edgar A. Calleson
By Cushman Darby & Cushman
Attorneys

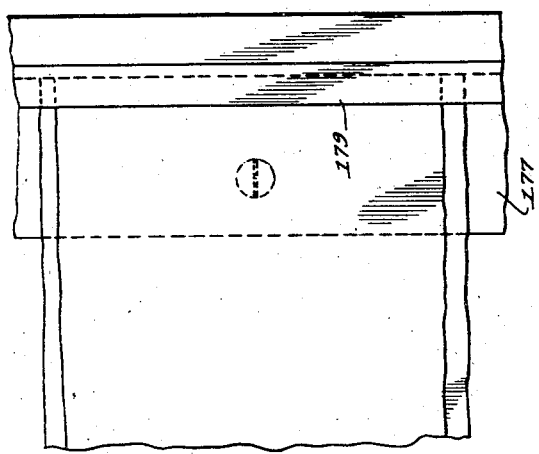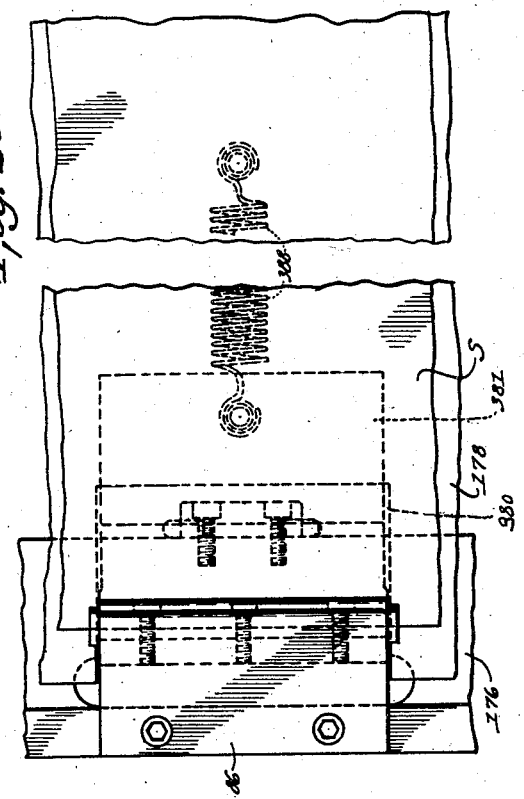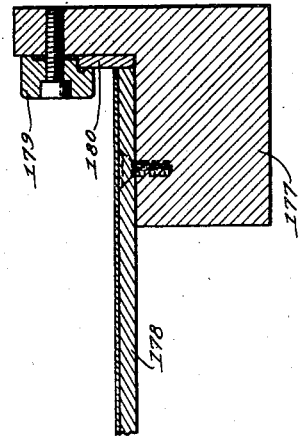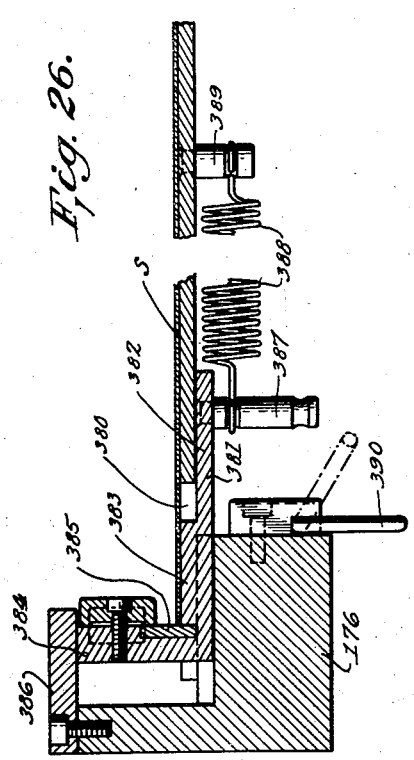
Inventors
Amos Calleson &
Edgar A. Calleson

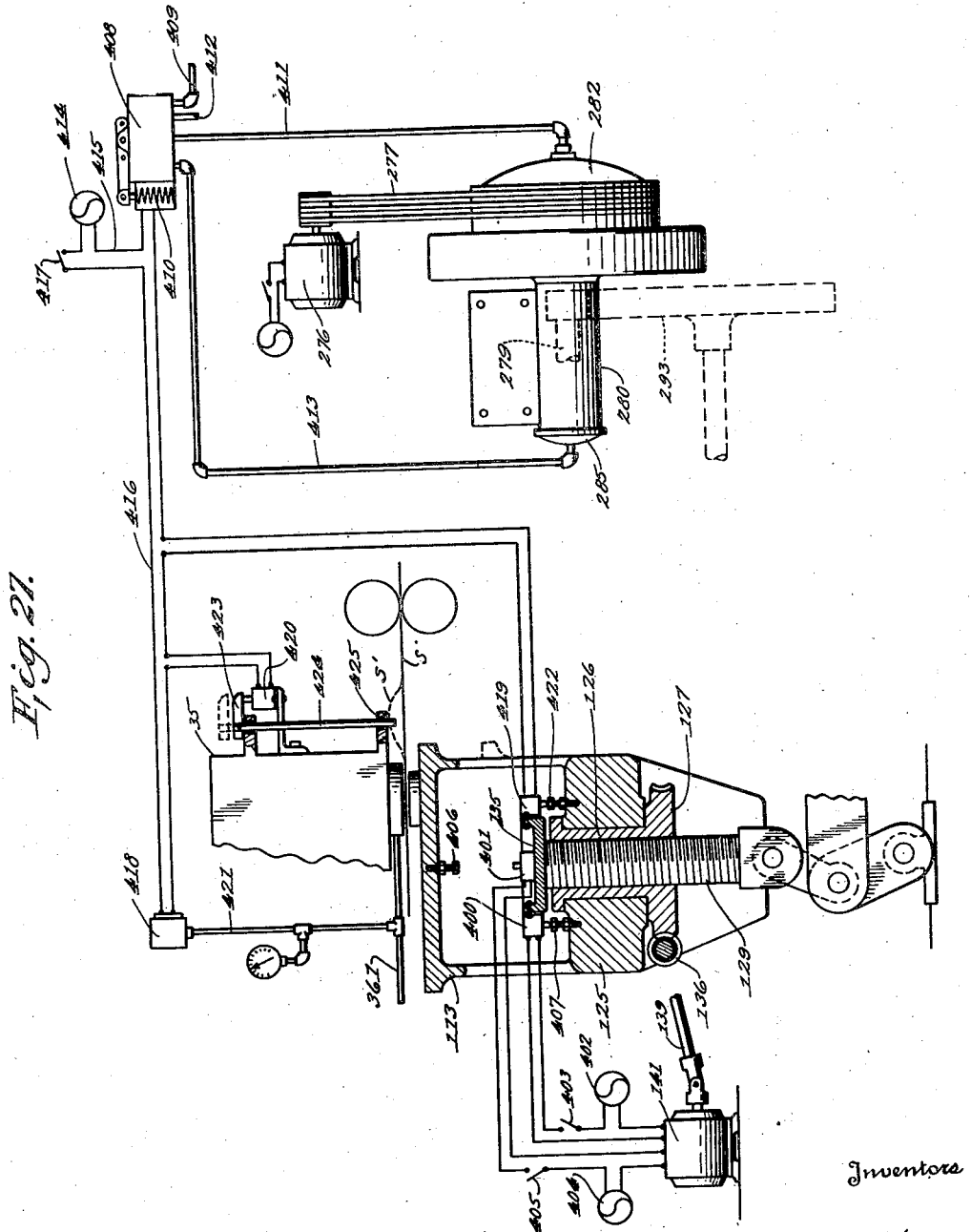

Patented Nov. 26, 1946

2,411,503

UNITED STATES PATENT OFFICE 2,411,503

CUPPING PRESS

Amos Calleson and Edgar A. Calleson, Merrick, N. Y., assignors to Crown Cork & Seal Company, Inc., Baltimore, Md., a corporation of New York Application January 3, 1941, Serial No. 373,028

32 Claims. (Cl. 113—38)

This invention relates to presses, and in particular to presses designed to draw a cup from a flat blank, for example as the initial step in the production of a drawn metal can. In preferred embodiment, the invention contemplates a press adapted to handle a strip material, and in this connection an object of the invention is to provide an improved feeding and guiding means for the strip so that the same will be presented accurately to the blank forming mechanism of the press. Another object is to provide drawing mechanism of double action type which will be more durable and will give greater output and better quality. Another object is to provide a yielding draw ring or rings designed to bear with exactitude to prevent the formation of wrinkles. Another object is to provide a press with minimum working stroke due to the spacing apart of the upper and lower forming members only sufficiently to readily receive a fed strip between them when the press is open. Another object is to provide improved drawing mechanism wherein binding effects are avoided, and wherein pressure on the blank margins is reduced during the drawing operation so that damage from excessive compression is obviated. Another object is to provide a movable die, rather than a movable draw ring, so that the necessary stroke of the drawing punch is shortened, thus providing smoother and more rapid operation. Another object is to provide for the rapid separation to a considerable distance apart of the coperating drawing elements so as to render the latter readily accessible for repair or replacement. Another object is to provide a scrap cutter automatically operated in timed relation and constituting a unit which may be readily moved from operative position to give access to the drawing mechanism. Another object is to provide safety features whereby the possibility of damage to the press in operation is reduced. Summing up the above and other objects which will appear hereinafter, the purpose of the invention is to provide a press adapted in each cycle of operation to feed a strip, punch a plurality of blanks from the strip, draw the blanks, clear the formed articles, and sever the scrap, all with exceptional speed, safety and accuracy. Description of the invention will be made with reference to a preferred embodiment shown by way of example in the accompanying drawings, in which Figure 1 is a front elevation of a press constructed in accordance with the invention.

Figure 5 is a plan view of the press.

Figure 6 is a section substantially on line 6—6 of Figure 5.

Figure 7 is a section substantially on line 7—7 of Figure 6.

Figure 8 is a section substantially on line 8—8 of Figure 1.

Figure 9 is a section substantially on line 9—9 of Figure 1.

Figure 10 is a section substantially on line 10—10 of Figure 11.

Figure 11 is a section substantially on line 11—11 of Figure 1.

Figure 12 is a section substantially on line 12—12 of Figure 2.

Figure 13 shows, in enlarged scale, structure appearing at the upper central portion of Figure 2.

Figure 14:
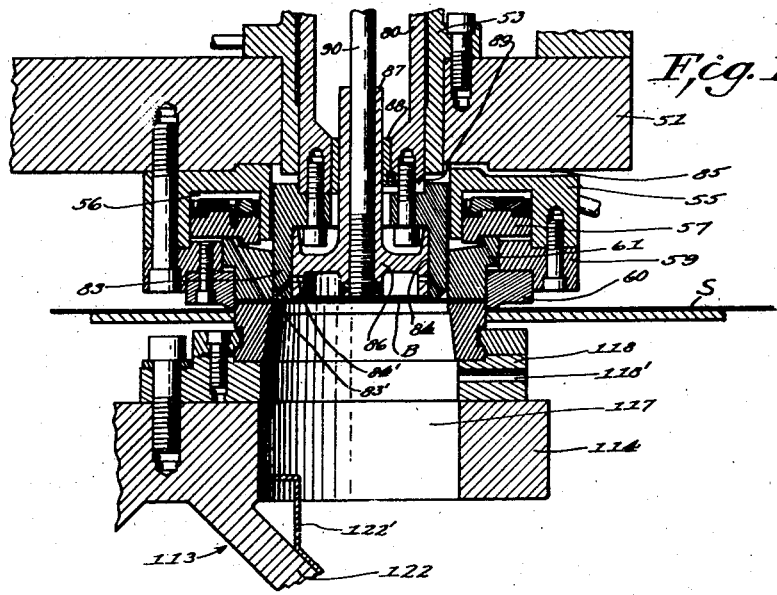

Figure 14 repeats in part the showing of Figure 13 with parts in different relation.

Figure 15:
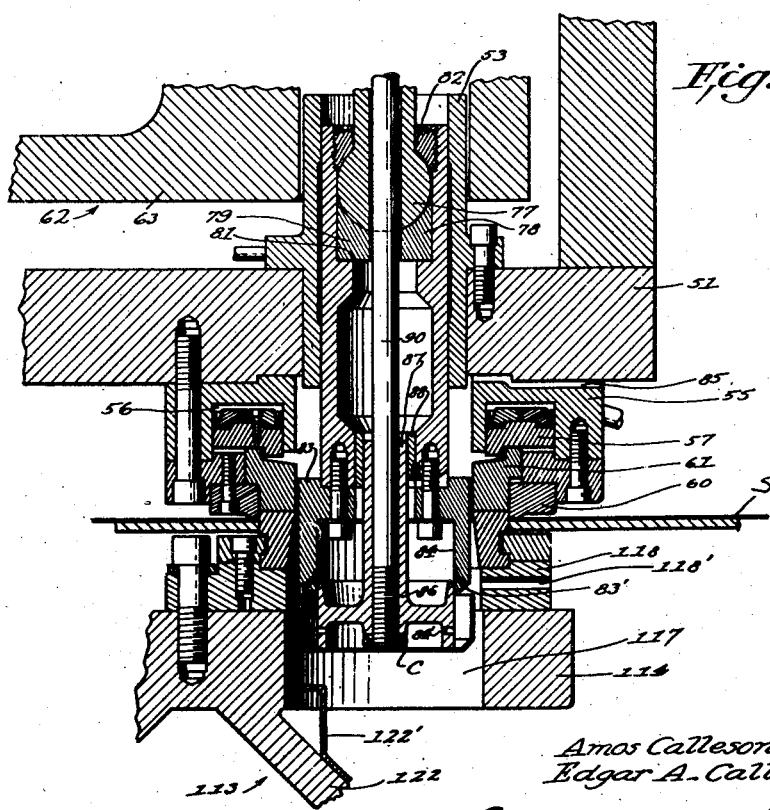

Figure 15 repeats in part the showing of Figure 13 with parts in still different relation.

Figure 3:
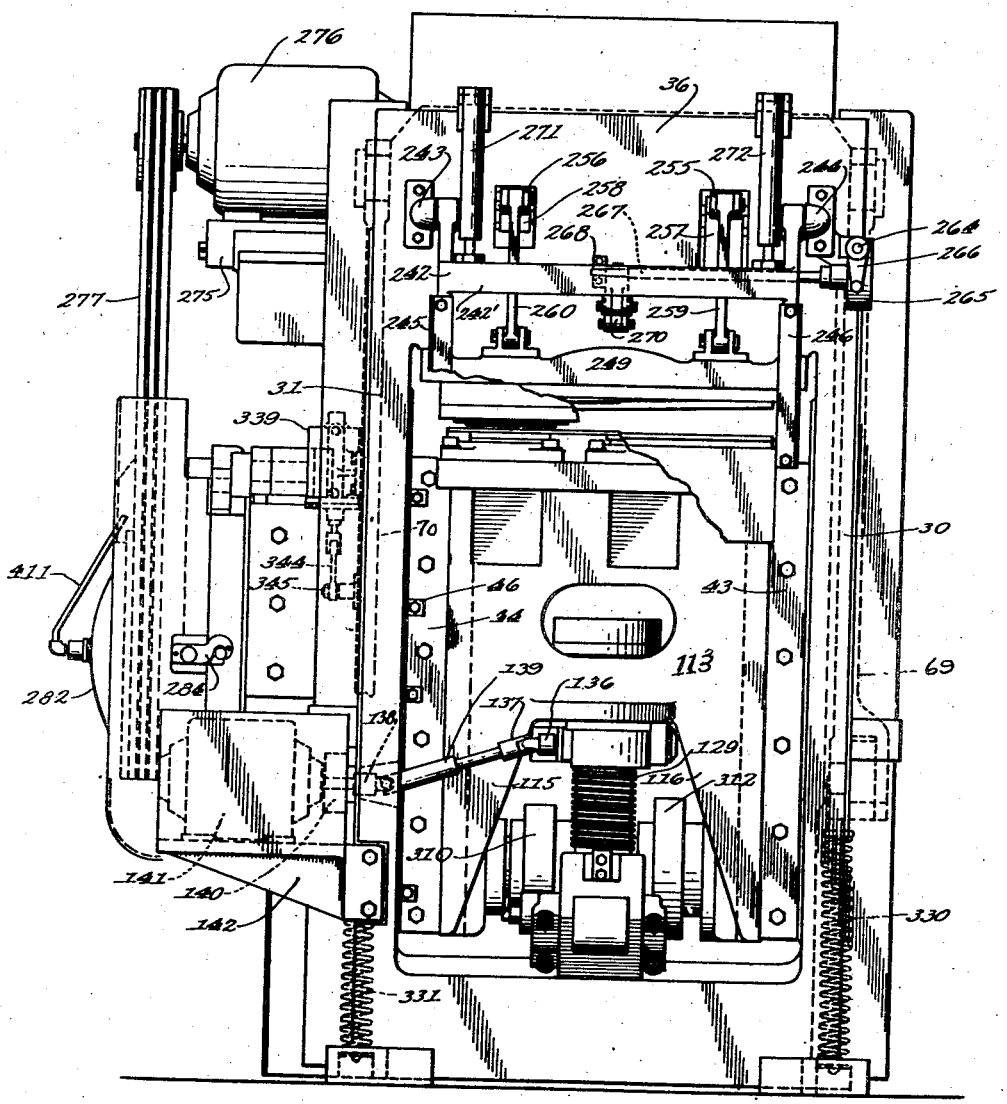
Figure 3 is a rear elevation of the press.
Figure 4:
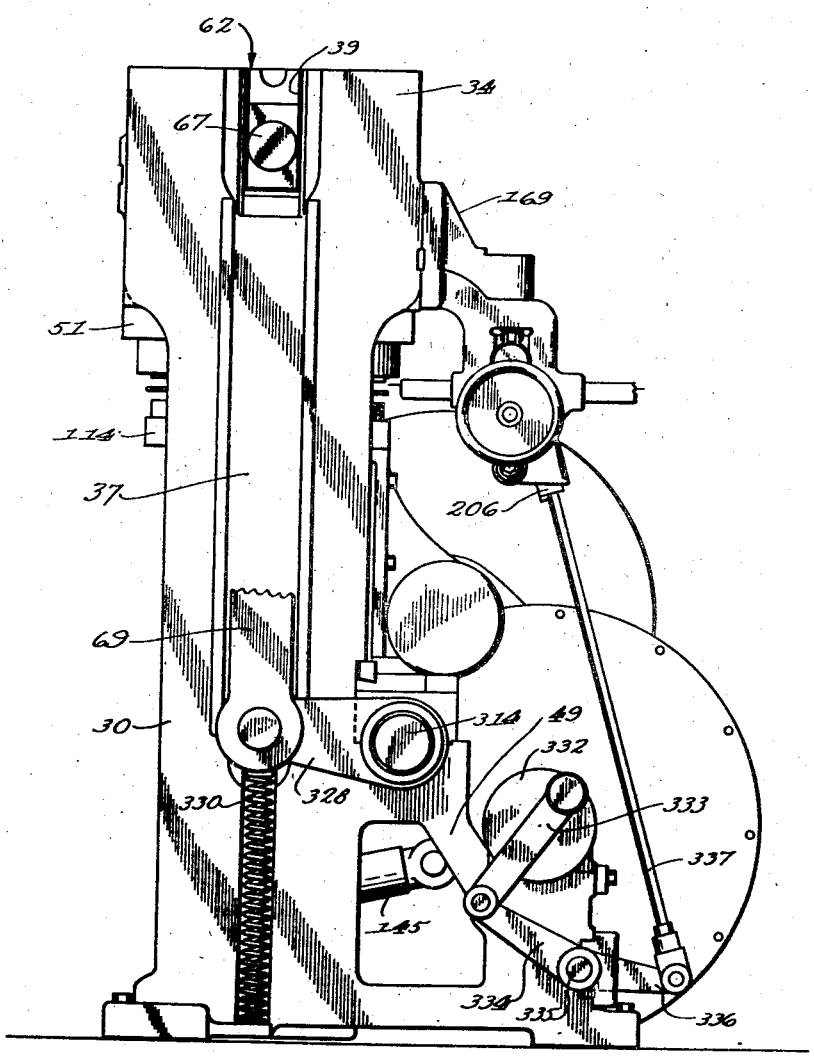
Figure 4 is a side elevation of the press with parts omitted.

Figure 16 is an axial section of pressure grading mechanism which appears in the left hand central portion of Figure 3.

Figure 1:
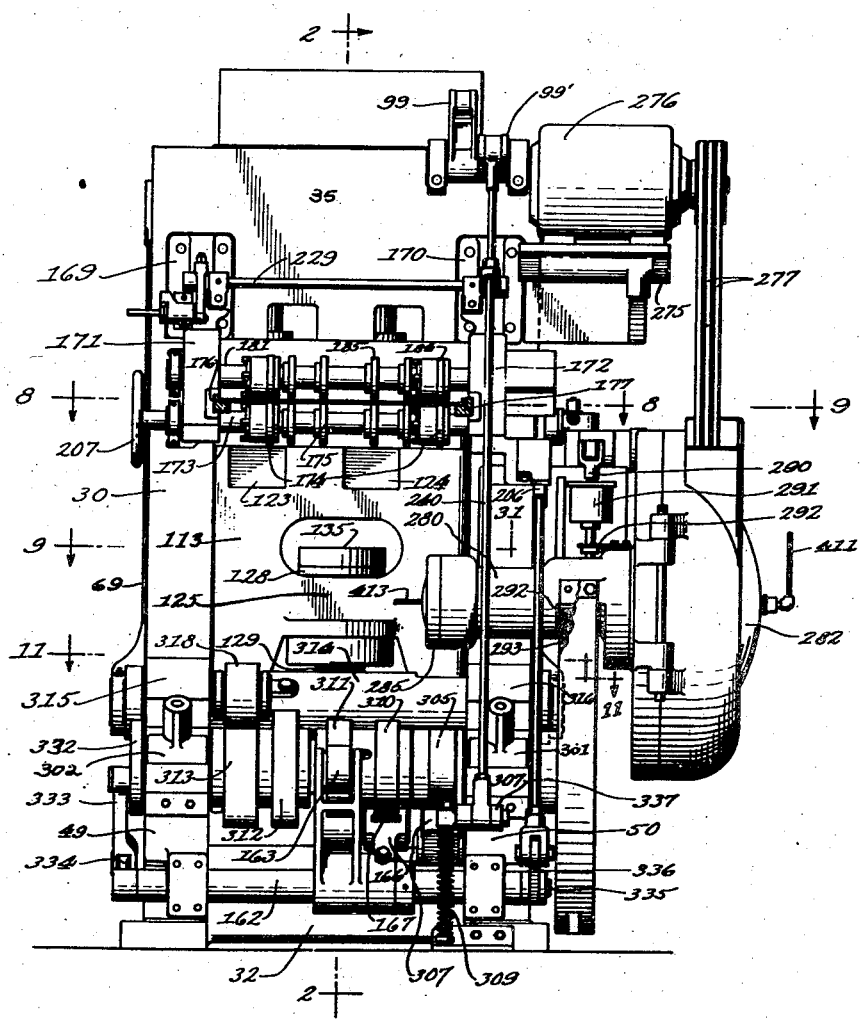

Figure 17 is an enlarged elevation of feed mechanism, seen from the front as in Figure 1.

Figure 18:
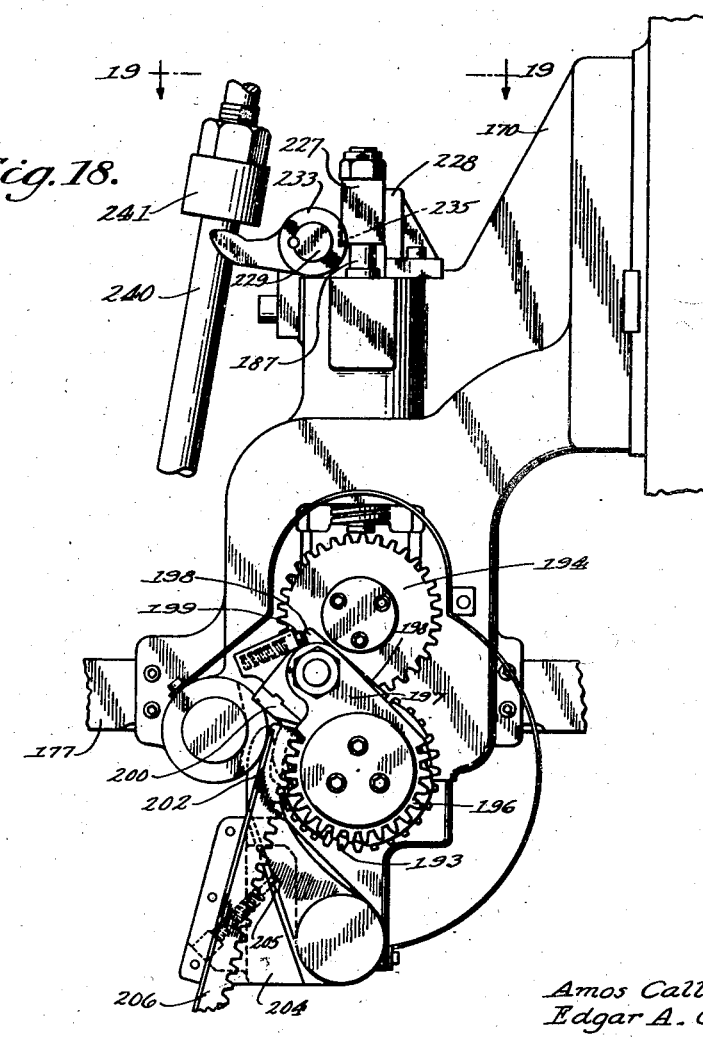

Figure 18 is an elevation of the mechanism of Figure 17 as seen from the right of that figure.

Figure 19:
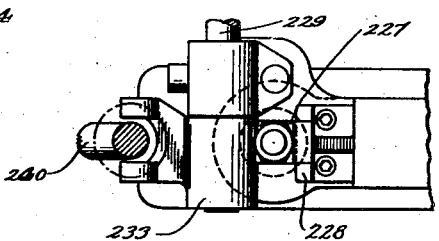

Figure 19 is a section on line 19—19 of Figure 18.

Figure 20:
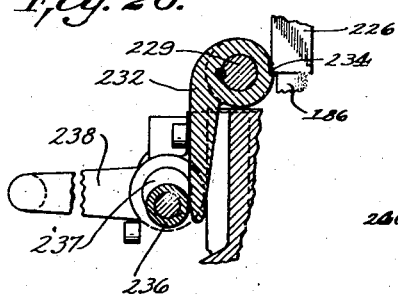

Figure 20 is a section on line 20—20 of Figure 17.

Figure 21:
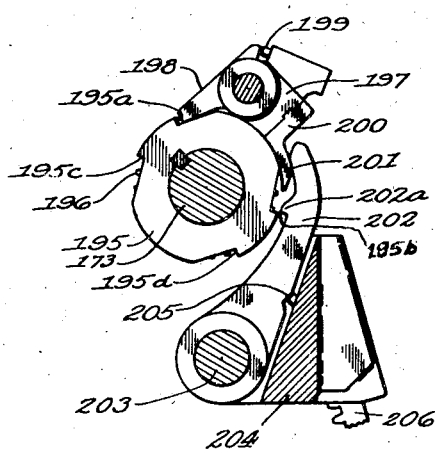

Figure 21 is a section on line 21—21 of Figure 17.

Figure 22:
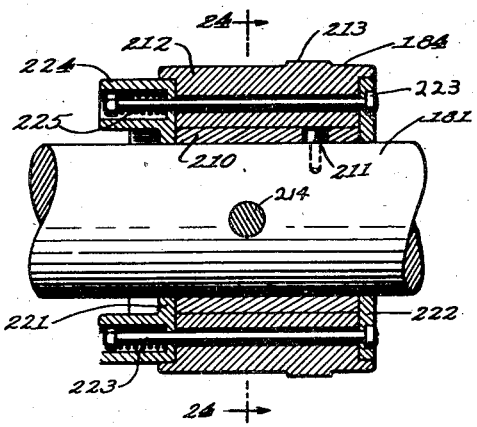

Figure 22 is a section on line 22—22 of Figure 17.

Figure 23:
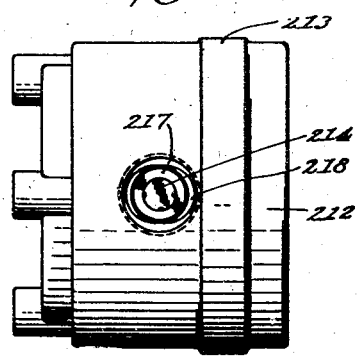

Figure 23 is an elevation of the mechanism of Figure 22.

Figure 24:
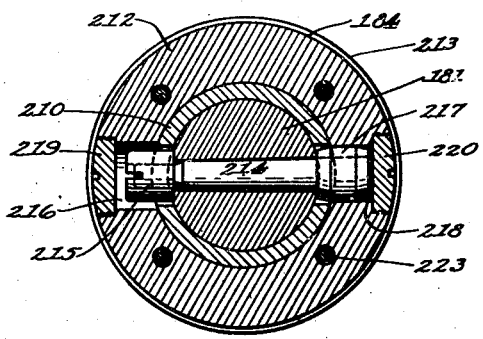

Figure 24 is a section on line 24—24 of Figure 22.

Figure 25 is a partial plan view of strip guiding mechanism.

Figure 2:
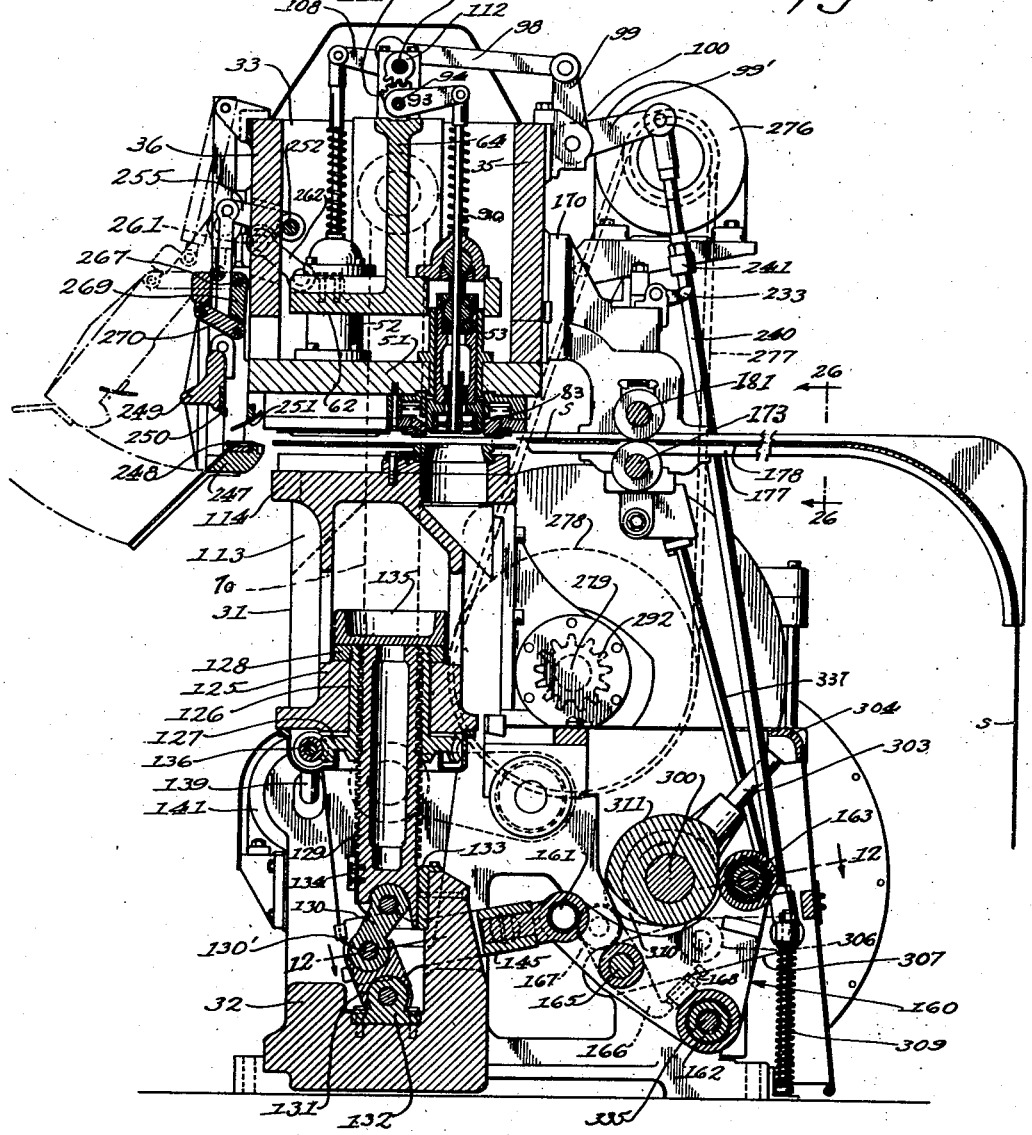
Figure 2 is a section substantially on line 2—2 of Figure 1.

Figure 26 is a section of the mechanism of Figure 25, taken substantially on line 26—26 of Figure 2, and Figure 27 is a diagram showing certain circuits and safety provisions.

*Main frame*

The main frame of the press comprises a pair of side standards 30 and 31, Figures 1 to 9 and 11, connected at their lower ends by a cross strut 32. The upper portions of the standards are somewhat expanded to provide side walls 33 and 34 which are joined by front and rear walls 35 and 36. The outer faces of the standards are provided with channels 37 and 38 which terminate upwardly in vertical guide openings 39 and 40 as particularly shown in Figures 4 and 5.

The inner faces of the standards are provided with vertical ribs 41 and 42 having faces, in a common plane, against which are bolted guide rails or tracks 43 and 44, the bolts passing through horizontally elongated openings in rail 44 so that the latter is adjustable toward and away from the other. The outer face of rail 44 is recessed to provide inclined surfaces with which cooperate a number of wedges 46, Figure 9, engaged by cap screws threaded into outer ribs of the rails. By loosening the rail bolts, proper adjustment of the rails is obtainable through adjustment of the wedges. Above the rails the inner faces of the side walls 34 and 35 are provided with vertical guideways 47 and 48, Figures 6 and 7, these guideways being respectively aligned with the rails 43 and 44.

The lower portions of the standards are extended forwardly at 49 and 50 to provide bearing portions for the operating shafts which will be later described.

*Bolster plate and appurtenances*

Reference numeral 51 designates a horizontal bolster plate secured against the lower edges of the front and rear frame walls 35 and 36 as indicated in Figure 2. The bolster plate is provided with two pairs of vertical circular openings which are staggered in the fore and aft direction of the press. Disposed in these openings and bolted to the top of the plate are guide sleeves of which two are indicated at 52 and 53, Figure 2. These sleeves are identical.

Referring particularly to Figures 13 to 15, it will be seen that the sleeve 53 terminates downwardly at about the lower level of the bolster plate and that at an intermediate point it is provided with a lubricant inlet duct 54 which communicates with grooves in the inner walls of the sleeve.

Secured to the bottom face of the bolster plate is a base member 55 which has a circular opening coaxial with sleeve 53. Member 55 is provided with a downwardly open annular recess 56 which constitutes a chamber for an annular piston 57 equipped at its top with suitable leathers as shown. An inlet duct 58 for fluid under pressure leads into the top of the chamber.

A retainer and adapter ring 59 is secured to the bolster plate through member 55 and projects into the outer marginal portion of the recess 56, piston 57 being normally borne against ring 59 by the pressure in the piston chamber.

Secured against the lower inner portion of ring 59 is a cutting ring 60 which provides a shoulder for the normal support of a draw ring 61, the draw ring having an upper annular portion engaged under piston 57. The draw ring and piston are slightly universally tiltable so that the draw ring is self-adjusting to evenly engage the margins of a blank during the drawing operation.

Similar draw and cutting ring equipment is associated with all the sleeves such as 53.

*Upper slide and appurtenances*

Reference numeral 62 designates an upper slide having a lower expanded portion 63 and a central transverse web 64 at the ends of which are portions 65 and 66, Figures 5 and 6, guided in the guideways 47 and 48, transverse displacement of the slide being prevented by shoulders bearing against the inner margins of the guideways as particularly shown in Figure 5.

Projecting from the sides of the slide into openings 39 and 40 are aligned trunnions 67 and 68 to which are pivoted the upper ends of links 69 and 70 which lie in the channels 37 and 38.

The lower expanded portion 63 of the slide is provided with four openings as at 71, Figure 13, aligned with the openings in the bolster plate and of a size to receive the upper portion of the sleeves as at 53. A cap 72 secured to the slide above opening 71 has a hemispherical internal bearing surface 73 engaged by the spherical head 74 of a link 75, the head being retained against the bearing surface by a retainer ring 76. Link 75 has a lower spherical head 77 whose end is engaged in a complementary seat 78 formed in a block 79 which is received in the upper end of a hollow cylindrical member 80, the block being held against a shoulder 81 by a retainer ring 82. Fixed to the lower end of member 80 is a drawing punch 83 having a cylindrical cavity 84 in its outer portion, the punch clearing through the opening in base member 55, having a sliding fit in the draw ring 61, and being normally positioned relative to the latter as shown in Figure 13. The punch carrier 80 has a sliding fit in sleeve 53. The lower outer edge of the punch is beveled and provided with openings 83' for the escape inwardly of air and oil trapped between the punch and the blank, the openings terminating inwardly in an annular groove. Compression or vacuum effects above the punch 83 are prevented by the provision of an air groove 85 in member 55.

It will be understood that similar punches, similarly mounted, are associated with the other draw and cutting ring assemblies. Any misalignment between caps 72 and sleeves 53 is accommodated by the double ball joint connections, thus preventing any binding action during the drawing operation.

*Knock-out devices*

Slidable in the cavity 84 of punch 83 is a pad or piston 86 having a hollow stem 87 guided in a bushing 88 fixed in the lower end of the carrier 80. The space above pad 86 is in communication with an air groove 89 formed in the lower edge of carrier 80 and it will be noted that the pad and punch are grooved and perforated in a manner so that vacuum or compression effects of any kind will be avoided, the pad having openings 84' communicating with the internal groove of the punch. The lower end of a rod 90 is fixed in the stem 87, the rod extending upwardly through perforations in the bearings 72 and 79 and a longitudinal bore of link 75, the clearances being such as not to interfere with the required flexibility of the ball joint.

The upper end of rod 90 is threaded into a fitting 91 and interposed between the latter and the cap 72 is a compression spring 92 which serves to yieldingly maintain the knock-out pad in the normal position shown in Figure 13 wherein it is entirely within punch 83. Fitting 91 is pivoted to an arm 93 fixed in radial, generally horizontally extending relation to a rock shaft 94 mounted in bearings 95 and 96 on the top of web 64 of slide 62. Fixed on shaft 94 adjacent bearing 96 is an arm 97 to which is pivoted one end of a link 98 whose other end is pivoted to an upright arm 99 of a bell crank lever 100 pivoted to brackets 101 on the front wall 35 of the frame, Figures 1, 2 and 5.

An arm 102, Figure 5, fixed on shaft 94, like, and disposed as arm 93, is pivoted to a fitting 103 associated with the knock-out mechanism for the punch at the left of punch 93.

Journaled in bearings 104 and 105 mounted on top of web 64 is a rock shaft 106 above and parallel to shaft 94, shaft 106 having fixed thereto arms 107 and 108 like arms 93 and 101, but extending oppositely. Arms 107 and 108 are pivoted to fittings 109 and 110 associated with the knock-out mechanism for the two rear punches. Arm 93, Figure 2, has a hub portion formed with gear teeth 111 which engage the teeth of a mutilated gear 112 fixed on shaft 106. The two gears are of the same size, and, consequently, when shaft 94 is rocked in a clockwise direction, all of the arms will be swung downwardly through the same angle.

Lower slide and appurtenances

A lower slide, generally designated by the reference numeral 113, has an upper flat table portion 114 and lower lateral legs 115 and 116, the sides of the slide being grooved for engagement with rails 43 and 44 as particularly shown in Figures 8, 9 and 11. The table portion is provided with openings beneath the four punches, that beneath punch 83 being designated by the reference numeral 117, Figure 13. Fixed on the table portion is a shoe 118 having a central opening coaxial with the opening 117 and secured on shoe 118 by means of clamping segments is a drawing die 119 designed for coaction with cutting ring 60, draw ring 61 and punch 83. The shoe has air openings as at 118'. The upper end of die 119 is received in an opening in a stripper plate 120, the latter being yieldingly supported with possibility of vertical adjustment by spring devices 121 of which there may conveniently be three, as shown in Figure 8. Beneath openings as at 117 are inclines as at 122, Figure 13, which lead to discharge openings as at 123 and 124, Figure 1, trips as at 122' being mounted on the inclines to tilt the formed articles for free discharge.

A cross portion 125 of slide 113 has a central vertical bore in which is rotatably received a nut 126 having a lower thrust member constituted by a worm gear 127 and an upper thrust member constituted by a ring 128 threaded on the upper end of the nut. Engaged in nut 126 is a vertical screw 129 whose lower end is supported on a transverse axis on the upper end of a link 130 pivoted through a pin 130' to a link 131 which is in turn pivoted on a bearing block 132 on the main frame cross portion 32, the links constituting a rearwardly breaking toggle. A flat lower front portion of the screw 129 bears against a wear plate 133 fixed on an upwardly extending portion of strut 32. Fixed to the lower rear portion of the screw is a stop 134 and fixed on the upper end of the screw is a cap 135 which projects over nut 126 to constitute an upper stop. The normal relation of the parts is shown in Figure 2.

Supported on suitable bearings beneath portion 125 of slide 113 and engaged with worm gear 127 is a worm 136 which through universal joints 137 and 138 and an extensible and collapsible drive shaft 139 and through a friction clutch 140 is connected to the armature shaft of a reversible motor 141 mounted on a bracket 142 fixed to the frame, Figures 2 and 3. By operating motor 141, nut 126 can be reciprocated between the stops 134 and 135. A preferred control system, as will be later described, involves limit switches operated by slide 113 for stopping motor 141 at the upper and lower limits of travel of the slide. It will be evident that by threading nut 126 downwardly on the screw the slide 113 can be lowered through a considerable distance so as to render the cutting and forming appurtenances readily accessible.

Pivoted to the central pivot 130' of the toggle constituted by links 130 and 131 is a yoke-shaped portion 144 of a link 145, Figures 2, 11 and 12, which includes a forward portion 146 having a square shank 147 engaged in a square socket 148 of portion 144. A transversely directed pocket 149 of portion 144 slidably receives a spring cup 150 which houses, as here shown, two springs 151 and 152 which bear at one end against the end wall of the cup and at the other against a follower 153 engaged by a cap screw 154 threaded in a closure 155 which is in turn threaded in the outer end of the pocket. Set in the end of the spring cup 150 is a block 156 having an inclined edge engaged with a similarly inclined edge of a block 157 set in shank 147. The engagement of the inclined portions of the blocks under the pressure of the springs is such that under ordinary tension applied to link 146, portion 144 will follow. Under extraordinary resistance, however, block 157 will cam block 156 outwardly and the link portions will separate.

Link portion 146 is pivoted between the rear portions of plate portions 158 and 159 of a lever 160 by means of a pin 161. Lever 160 is pivoted on a hollow shaft 162 which extends between and through bearings provided in frame portions 49 and 50. Between forward portions of plate portions 158 and 159 a cam following roller 163 is mounted on a pin 164. Pivoted on the right hand side of levers 160 to the rear of shaft 162 is an arm 166 which at its upper bifurcated end carries a cam following roller 167, the lower end of the arm engaging an adjustable abutment 168 on the hub of lever 160 so that counterclockwise swinging of arm 165 is positively limited. When lever 160 is swung in clockwise direction, Figure 2, by means to be hereinafter described, the toggle constituted by links 130 and 131 is straightened to a controlled extent and slide 113 is elevated in its working stroke.

Strip feeding and guiding mechanism

Secured to the front wall 35 of the frame is a pair of brackets 169 and 170, Figures 1 and 17 to 20, 25 and 26, having depending portions 171 and 172 in the lower extremities of which is journaled a roll shaft 173 on which is mounted a pair of feed rolls 174 and intermediate circular discs 175 which serve as hold-down members and have no feeding function. Rails 176 and 177, of angular section, having horizontal portions supporting a feed plate 178 which is interrupted at the feed rolls and hold-down discs and has its top surface tangential to the tops of the lower feed rolls and at the height of the top surface of the stripper plate 120. Clamped against an upwardly extending flange of rail 177 by means of a block 179 is a rectilinear wear strap 180 which is parallel to the press center line and so properly guides the right hand edge of the strip.

The left hand portion of the plate 178 is provided with a plurality of rectangular recesses as at 380, Figures 25 and 26, in which are slidable blocks or slides 381 in the transverse direction of the plate, these blocks each having a portion 382 slidable beneath the plate 178, a portion 383 having a top surface level with the top of the plate, and an upstanding portion 384 against which is clamped a rectilinear wear strip 385. The left hand end of slide 381 is held down by a plate 386 secured to the top of a vertically extending flange of rail 176. A post 387 is fixed in and extends downwardly from slide 381 and is engaged by one end of a tension spring 388 whose other end is anchored to a post 389 fixed in and extending downwardly from plate 178. The slides, as at 381, engage the left hand edge of strip S so that the right hand edge of the latter is at all times yieldingly held against the wear strip 180. When the slides are pulled to the left, the lower ends of the posts as at 387 may be engaged by pivoted rings 390 to hold the slides out so that the strip may be readily threaded through the apparatus, the feed rolls at this time being separated by means which will be later described.

A shaft 181 has its ends journaled in blocks 182 and 183 vertically slidable in guideways in bracket portions 171 and 172 and carries feed rolls 184 and hold-down discs 185 which are directly above the lower rolls and discs. Rods 186 and 187 threaded in the upper portions of blocks 182 and 183 extend upwardly through bores 188 and 189, Figure 17, provided in the brackets. Sleeves as at 190 threaded in the upper ends of bores 188 and 189 serve as abutments for the upper ends of compression springs 191 and 192 which bear at their lower ends against blocks 182 and 183, thereby yieldingly urging rolls 184 toward rolls 174 so as to cause the rolls to engage the strip S with feeding pressure.

Fixed on shaft 173 outwardly of bracket portion 172 is a gear 193 which meshes with a gear 194, of equal size, fixed on shaft 181. Fixed on shaft 173 outwardly of gear 193 is a ratchet wheel 195 beyond which a mutilated gear 196 is freely carried by the shaft. An arm 197 projecting from gear 196 carries a pawl 198, Figures 17, 18 and 21, having a nose portion cooperable with ratchet wheel 195 and urged into engagement with the ratchet wheel by a spring-pressed plunger 199 on an arm 197. Also fixed to arm 197 in the plane of pawl 198 is a member 200 having a tapered foot portion 201 cooperable with a latch or stop member 202 pivoted at 203 on a lower extension 204 of bracket portion 172 and urged toward the ratchet wheel 195 by a spring-pressed plunger 205. A rack 206 guided in extension 204, Figure 18, engages gear 196. With the parts in the position shown, and as particularly seen in Figure 21, the nose of pawl 198 is behind a shoulder 195a of the ratchet wheel and the foot portion of member 200 is interposed between the ratchet wheel and the extremity of stop 202 so that the nose 202a of the latter is held away from shoulder 195b of the ratchet wheel so that the latter is free to be driven. If rack 206 is moved upwardly, the ratchet wheel and therewith shafts 173 and 181 are driven in a direction to feed the strip. As this drive proceeds, foot portion 201 moves away from ratchet 202 so that the nose 202' of the latter rides on the periphery of the ratchet wheel. As the stroke of pawl 198 is completed, shoulder 195c of the ratchet wheel engages nose 202a of the latch to prevent overthrow. As rack 206 returns to normal position, portion 201 engages the extremity of latch 202 and returns it to the position of Figure 21. the pawl dropping behind shoulder 195d of the ratchet wheel so that the parts are conditioned for the succeeding feeding operation. Shaft 173 is equipped with a hand wheel 207 for manual adjustment of the feed, and desirably friction brakes 208 and 209 for the feed shafts, anchored on the shaft bearings, are provided.

The feed rolls 174 and 184 are identical and roll 184 is shown in detail in Figures 22 to 24. Referring particularly to these figures, a cylindrical core or sleeve 210 is positioned on shaft 181 by means of a screw 211 and is surrounded by a ring 212 which has a peripheral rib 213 for driving engagement with the strip. A tapered pin 214 is received in a tapered diametrical bore in shaft 181 and held by a cylindrical nut 215 which is threaded on one end of the pin, the nut being received in an opening in sleeve 210 and in an enlarged opening 216 in ring 212. The other end of pin 214 carries a roller 217 which is received in an opening in sleeve 210 and in an axially elongated opening 218 of ring 212. It will be evident that rotation of shaft 181 will be transmitted to ring 212 through roller 217 and that the ring can move axially of the shaft due to the axial elongation of the opening 218. Openings 216 and 218 are provided with threaded closures 219 and 220.

Retainer rings 221 and 222 at the ends of sleeve 210 and ring 212 are connected together by bolts 223 extending through axial bores in ring 212. The left hand ends of bolts 223 are received in spring pockets 224 and compression springs 225 are interposed between the nuts and the bottoms of the pockets. Consequently, the ring 212 is yieldingly held in the position particularly shown in Figure 22, although it can move longitudinally of shaft 181 to some extent in either direction.

The axial displaceability of the feed rolls is provided in order to allow the strip to be fed through with its right hand edge against the stationary guide 180, but not forced into or away from the guide by the action of the rolls. During feeding there may be a tendency for the rolls to force the strip out of its path, due, for example, to a slight misalignment of the feed rolls, to lack of uniformity in strip thickness, or to wrinkles or the like in the strip. The yieldable feed rolls will move axially, allowing the sheet to follow its correct path.

In order to permit the return of the feed roll rings to normal position, if they have been axially displaced during a feeding operation, the following mechanism is provided:

Rods 186 and 187 have their upper ends engaged in square sleeves 226 and 227 which are retained by nuts threaded on the extremities of the rods. The rear faces of sleeves 226 and 227 are slidable against the faces of backing brackets as at 228, Figure 18. A rock shaft 229 is journaled in bearing members 230 and 231 fixed to the main brackets 169 and 170 and has fixed thereon dogs 232 and 233 which include collar portions notched to provide shoulders 234 and 235, Figures 18 and 20, which underly the forward lower edges of sleeves 226 and 227. Dog 233 has a forked end straddling a rod 240 beneath a collar 241 adjustably fixed on the rod, the upper end of the rod being pivoted to the other arm 99' of bell crank lever 100, Figure 2. Consequently, each time rod 240 is pulled downwardly, by means which will be later described, to operate the knock-outs, dog 233 is swung in a counterclockwise direction, Figure 18, rocking shaft 229 and pulling rods 186 and 187 and bearings 182 and 183 upwardly so that shaft 181 is lifted clear of the strip S. Thus between feeding operations the feed rolls are freed and under the action of their springs are returned to normal position if they have been displaced during the preceding feeding operation.

The free end of dog 232, Figures 17 and 20, lies behind a roller 236 mounted on an eccentric pin at one end of a shaft 237 to the other end of which is secured a crank 238, the shaft being journaled in a bearing member 239 on bracket 169. It will be evident that by swinging crank 238 in a counter-clockwise direction, Figure 20, shaft 229 will be rocked to elevate shaft 181. This manual elevating means is principally useful when the strip is being initially threaded through the apparatus, at which time, as has previously been mentioned, the left hand strip guiding slides, as at 381, Figures 25 and 26, are held outwardly by the rings as at 390.

Preferably, the strip S is brought to the feed rolls in such manner that the rolls exert little, if any feeding effect and have mainly a regulatory effect on the strip advance. That is, unwinding mechanism is provided which preferably tends to push the strip to the feed rolls.

Scrap cutter

Referring to Figures 2 and 3, a frame 242 has upwardly extending arms pivoted to brackets 243 and 244 on the rear wall 36 of the main frame. The frame includes lower side portions 245 and 246 connected at their lower ends by a bed plate 247 on which is fixed a knife 248. Slidably guided between frame portion 245 and 246 is a cross head 249 equipped with a blade 250 for cooperation with blade 248. The latter in the normal position of frame 242 is at about the level of the stripper plate 120 and above this plate the frame carries a guide plate 251. A rock shaft 252 mounted in bearings 253 and 254 on the inner face of wall 36, Figure 5, has fixed thereto a pair of arms 255 and 256 which extend through openings 257 and 258 in the wall and are pivoted to the upper ends of links 259 and 260 whose lower ends are pivotally connected to the top of cross head 249.

Arm 255 is provided between its ends with downward extensions which support a pivot pin 261 on which is pivoted one end of a link 262 whose other end is pivotally connected to a bracket 263 on the upper slide 62. When the slide is moved downwardly, shaft 252 is rocked and operatively moves knife 250 relative to knife 248 to sever the scrap, knife 250 returning as the slide is returned.

Bearing 244, Figure 3, has a lower extension providing bearings for a worm 264 and for a worm wheel, in a housing 265, engaged by the worm. The worm has fixed thereon a crank 266. The worm wheel is fixed on a shaft 267 which extends part way across the outside of wall 36 to a bearing 268, Figure 3, on the rear wall 36 of the main frame. Fixed on shaft 267 centrally of frame 242 is a link 269 whose free end is pivoted to one end of a link 270, whose other end is pivoted to a cross portion 242' of frame 242. By turning crank 266 in the proper direction the toggle constituted by links 269 and 270 is straightened, thus swinging frame 242 to the dot and dash position of Figure 2, this operation being assisted by a pair of tension devices 271 and 272 which are pivotally connected between the main frame and the cutter frame. With the cutter thus positioned the cutting and punching instrumentalities are rendered accessible from the rear. Reverse operation of crank 26 collapses the toggle and returns the frame to operative position wherein it is locked by the worm and worm wheel.

Drive mechanism

Mounted on a table 275 secured to the upper portion of standard 31 is a motor 276 connected by belts 277 with a pulley 278 which is free on a main drive shaft 279, Figure 2 journaled in a housing 280 secured in transversely extending relation to standard 31, Figure 1. A fly wheel 281 is free on shaft 279 adjacent and fixed to pulley 278, Figure 9. Drive from the pulley to the shaft is adapted to be effected by means of an air clutch 282 which may be similar to that disclosed in the patent to Gladfelter, No. 2,013,144, granted September 3, 1935. The pulley and fly wheel are disposed in a housing constituted in part by a pivoted portion 283 held in closed position by a latch 284. An air brake for shaft 279 is disposed in a housing 285 at the opposite end of the shaft from the pulley and may be of any suitable construction, air pressure serving to close the brake. A rock shaft 286 supported in a bracket 287, Figure 9, has at one end an eccentric pin carrying a brake shoe 288 cooperable with the rim of the fly wheel 281. An arm 289 fixed on shaft 286 has its free end pivoted to a rod 290 on which is fixed a piston in a cylinder 291, Figures 1 and 9, the piston being supported on a bracket 292 on housing 280. The fly wheel brake is applied by admitting air under pressure to cylinder 291 through any suitable type of valve.

A pinion 292 fixed on an intermediate portion of shaft 279 engages a gear 293, Figure 1, fixed on a main shaft 300 whose ends are journaled in bearings 301 and 302 on frame portions 49 and 50. As here shown, the bearing caps are provided with sockets in which are engaged struts as at 303, Figure 2, supporting a cross bar 304 to which housing plates are secured. Adjacent bearing 301, shaft 300 has fixed thereon a single-rise cam 305, Figures 1 and 11, which cooperates with a roller 306, see also Figure 2, carried by a lever 307 pivoted at 308 on a pin extending inwardly from frame portion 50. The forwardly projecting end of lever 307 is pivoted to the lower end of rod 240, which latter is adjustable as to length. The cam following roller 306 is borne against cam 305 by means of a compression spring 309 under the free end of lever 307.

To the left of cam 305, a cam 310 is fixed on shaft 300 and cooperates with roller 167 which, it will be remembered, is carried by the arm 166 mounted on lever 160. The roller 163, carried by lever 160 follows a cam 311 fixed on shaft 300 to the left of cam 310. The profiles of these latter cams appear in Figure 2.

To the left of cam 311, cams 312 and 313 are fixed on shaft 300, the profiles of these cams being shown in Figure 10.

Referring to Figures 1, 2, 4, 10 and 11 in particular, a shaft 314 is journaled in bearings 315 and 316 at the top of main frame portions 49 and 50 and is equipped with a fixed arm 317 having a forked end receiving a roller 318 on a pin 319, this roller constituting a follower for cam 313. A pin 320 has a squared portion 321 secured in a rectangular recess at the end of a further arm 322 on shaft 314. A lever 323 pivoted on a round portion of pin 320 carries in its lower forked end a roller 324 on a pin 325, this roller constituting a follower for cam 312. Lever 323 has a portion extending oppositely from its roller carrying portion and equipped with a wear piece 326 engaged by an adjusting screw 327 threaded in shaft 314 and projecting therethrough. Screw 327 limits counterclockwise movement of lever 323 about pin 320.

Outwardly of the standards, shaft 314 has fixed thereto arms 328 and 329 whose outer ends are pivoted in the forked lower ends of links 69 and 70, the lower ends of the latter resting on balancing springs 330 and 331.

To the extreme left hand end of shaft 300 is fixed a disc 332 just outwardly of the bearing. An eccentrically disposed pin projecting from the outer face of the disc has pivoted thereto one end of a link 333 whose other end is pivoted to an arm 334 fixed on a rock shaft 335 which extends through the hollow shaft 162, shaft 335 projecting at the right hand end of shaft 162 and having fixed thereon an arm 336 whose end is pivoted to a link 337 whose upper end is secured to the rack 206 with capability of adjustment for length.

Pressure grading

Mounted on a bracket 338 secured on standard 31 and straddling link 70 is a cylinder 339 in which is reciprocable a piston 340 having a piston rod 341 extending through a gland 342 and swivelled through a clevis 343 to the upper end of a link 344 whose lower end is engaged by a pin 345 projecting from a plate 346 fixed against the outer face of link 70. The piston carries a leather 347 having a skirt urged outwardly by means of a coil spring 348 set in an annular groove 349. A by-pass 350 connects the lower end of the piston chamber with a valve chamber 351 at the top of the cylinder, the valve chamber communicating with the piston chamber above the piston through a passage 352 having a valve seat 353 at its upper end. Cooperable with the valve seat is a conical valve head 354 at the lower end of a hollow body 355 which is vertically slidable in a neck 356. A compression spring 357 in body 355 bears at its lower end against the valve head and at its upper end against a closure cap 358. A lower annular groove 359 in the valve body is in communication with the interior of valve body 355 so as to avoid vacuum or compression effects above the latter. A pin 360 projects downwardly from the valve head 354 through opening 352 and is adapted to be engaged by the piston 340. A pipe 361 is connected into the upper part of the cylinder 339 and is in communication with the piston chamber above the piston.

A suitable source of constant pressure is connected into an air tank 362' through a pipe 362 in which is interposed a control valve 363, a pressure reducing valve 364 and a pressure gauge 365. A pipe 366 leads from the air tank through a relief valve 367 and a control valve 368 to the bottom of by-pass 350 through a connection 369, and is continued through a pressure reducer valve 370 to a connection 371 with pipe 361. Beyond this connection pipe 361 runs to a pressure gauge 372 and then through four branches to the annular piston chambers through the ducts as at 58.

In Figure 16 piston 340 is in normal position at the top of its stroke and through abutment with pin 360 has unseated valve 354 and maintains it unseated. Consequently, pressure from pipe 366 goes to pipe 361 through by-pass 350, valve chamber 351, passage 352 and the top of the cylinder chamber. This means that the draw rings are yieldingly held down by a regulated pressure. Pressure also goes to pipe 361 through the pressure reducer valve 370, this connection being provided for the purpose of compensating for any leakage from the annular recesses as at 56. If piston 340 is moved downwardly, valve 354 is closed by spring 357 and consequently due to the enlarging chamber above the piston the pressure above the draw rings is progressively relieved.

The pressure grading mechanism can of course be dispensed with in some cases, depending on material and draw, but an air cushion is preferably provided in any event.

Safety provisions

In order that the slide 113 can be lowered and raised through a predetermined range without jamming at either end, we preferably provide limit switches 400 and 401 on the cap 135, Figure 27. Switch 400 is in connection with motor 141 through a source of electrical current 402 and an "up" switch 403. Switch 401 is in connection with motor 141 through a source of electrical current 404 and a "down" switch 405. In the position of parts shown in Figure 27, if switch 405 is closed, motor 141 will rotate nut 126 in such direction that slide 113 will be lowered until an adjustable abutment 406 strikes the operating element of switch 401 and opens the latter. If switch 403 is now closed, motor 141 will be reversely driven and slide 113 will be elevated until an adjustable abutment 407 strikes the operating element of switch 400 and opens the switch. In this manner the slide 113 is quickly movable between definite limits with no danger of jamming at either end. Desirably, a friction clutch, such as is shown at 140, Figure 3, is interposed in the drive so that slippage can occur in case of emergency.

Reference numeral 408 designates a solenoid controlled valve for controlling the supply to or exhaust from air clutch 282 and air brake 285. A compressed air pipe 409 leads to the valve 408 and when the coil 410 of the valve is energized, pipe 409 is in connection with a pipe 411 running to the clutch while an exhaust pipe 412 is in connection with a pipe 413 which runs to the brake. Motor 276 can now drive through clutch 282 to the shaft 279. Should coil 410 become deenergized, pipe 409 is immediately transferred to pipe 413 and pipe 411 to pipe 412 so that the clutch is opened and the brake is applied.

A source of electric current 414 is connected through a wire 415 with one end of the winding of solenoid 410. The source is connected to the other end of the winding through a wire 416 in which is interposed a starting switch 417, a diaphragm switch 418, and switches 419 and 420, all in series. Switch 418 is in connection through a pipe 421 with the supply pipe 361 for the air cushions, and if adequate pressure exists in the line, switch 418 is closed. The switch will open if the pressure falls below the predetermined minimum.

Switch 419 is carried by cap 135 and is closed when slide 113 is in its fully elevated position. Under this condition the operating element of the switch has engaged an adjustable stop 422 on the slide to close the switch, the switch opening when away from the abutment. Consequently, the switch will be open unless slide 113 is in its upper operative position.

Switch 420 is supported on a bracket on the front wall 35 of the machine and has an upwardly extending operating element normally held depressed, to close the switch, by a head 423 on the upper end of a rod 424, the rod being vertically slidable in brackets projecting from the wall 35, the opening in the lower guide member being lined with friction material 425 so that the rod is frictionally retained in the lower position shown in full lines or in the upper dotted line position wherein head 423 has released switch 420, permitting it to open. The lower end of the rod is adjacent the top of the strip S and the rod will be lifted if the sheet should buckle as at S' upon the occurrence in the press of any resistance to feed.

It will thus be evident that drive cannot be effected through clutch 282 unless the proper pressure exists in the cushion chambers, unless the sheet is flat beneath rod 424, and unless slide 113 is in operative upper position. If pressure falls in the cushion chamber, switch 418 will open and if there is impediment to feed, switch 420 will open. Any open switch in the wire 416 will cause the opening of clutch 282 and the application of brake 285. Coil 410 must be energized at all times if the machine is to operate.

*Operation*

The operating cycle is as follows:

Drive from motor 276, clutch 282 being closed, causes shaft 300, Figure 2, to be driven in clockwise direction. During substantially its first half revolution, upward thrust is imparted to rack 206 by means of the previously described linkage between the rack and disc 332 and the feed rolls advance the strip the proper distance across the stripper plate and dies. Upon completion of the feed, a rise of the work cam 311 reaches roller 163 and lever 160 is swung in a clockwise direction, roller 167 riding on a drop of the return cam 310, and through link 145 the toggle 130, 131 is straightened a predetermined extent, thus elevating the lower slide 113 through screw 129. Should a tool or the like have been left on top of the slide so as to prevent upward movement of the latter, link 145 will separate in the manner previously described, thus avoiding damage to the machine. Assuming the upper stroke of the lower slide to be completed, the parts are now in the relation shown in Figure 14 wherein a blank B has been cut from the strip and the marginal portion of the blank is engaged by the draw ring and the drawing die with a force determined by the cushioning pressure above the annular piston 57. At the end of the upward movement of the lower slide a dwell of cam 311 reaches roller 163 and the slide is held in elevated position.

A rise of the work cam 313 now reaches roller 318 and shaft 314 is rocked, this being permitted by the fact that a drop of the return cam 312 has reached roller 324. The rocking of shaft 314 swings arms 328 and 329 downwardly so that through links 69 and 70 the upper slide is pulled downwardly against the pressure of springs 330 and 331. Downward movement of the upper slide causes the drawing punches to draw the blank, the punches coming to the position shown in Figure 15. As link 70 moves downwardly the pressure above the draw rings is progressively relieved by the pressure grading apparatus previously described. The pressure on the marginal portion of the blank is thus gradually reduced during the drawing operation, this helping to prevent ears on the edge of the drawn cup. An even draw, with lack of binding, is assured by the self-adjustment of the punches as permitted by the ball connections.

During the downward movement of the upper slide the link 262, Figure 2, rocks shaft 252 so that cross head 249 is lowered and the scrap is severed.

At this point the rise of cam 305 engages roller 306 of lever 307 so that the lever is swung downwardly to operate the knock-out pads, these moving to the position of Figure 15 and clearing the cups C from the dies. Toward the end of this operation shaft 229 is rocked to elevate the upper feed rolls in the manner previously described.

The rise of cam 305 now passes away from roller 306, spring 309 returns rod 240 to its upper position and cams 310 and 312, acting on rollers 167 and 324, respectively, return the slides to normal position of rest.

It will be observed that in the illustrated machine the movements of the slides, knock-outs, and feed rolls are all conveniently derived from the main shaft 300. The slide movements, both work and return, are derived from cams which are formed to afford the most effective operation. The work stroke is powerful and the return rapid with extremely little jar. The speed of the press is increased by reason of minimum clearance between the upper and lower cooperating members and by reason of the fact that the punches work in stationary draw rings and consequently their necessary stroke is shorter than would be the case if the draw rings were moved toward stationary drawing dies. In the latter case the punches have to have a stroke which includes the range of movement of the draw rings toward the dies.

While we have spoken of strip material throughout the description, it is obvious that the press can also handle sheets and, for that matter, the punching apparatus will operate equally well on pre-formed blanks. The invention is of course susceptible of varied embodiment and accordingly we do not limit ourselves as to form and arrangement of parts except as in the following claims.

We claim:

1. A press comprising a punch, means for guiding said punch substantially rectilinearly, a rectilinearly reciprocable slide, thrust means between said slide and punch comprising a link having a ball head at each end and bearings for said heads in connection with said slide and punch respectively, said link having an axial bore and said bearings having perforations registering with said bore, a knock-out member movable in said punch, and an operating rod for said member extending with clearance through said perforations and bore.

2. A press comprising a bolster plate, a base member secured to said plate and having an annular recess, said recess constituting a piston chamber which is open away from the base, an annular piston in said chamber, a retainer ring for the piston closing the outer portion of said recess, a cutting ring secured to said retainer ring, a reciprocable draw ring guided in said cutting ring and having a portion engaged by said piston inwardly of said retainer ring, means for leading fluid under pressure into said recess whereby to provide a cushion backing for said draw ring, and a drawing punch reciprocable in said draw ring.

3. A press comprising cooperating draw ring and drawing die members, a reciprocable drawing punch cooperating with said die member, a piston backing one of said members, means defining a chamber for said piston, conduit means for supplying fluid under pressure to said chamber whereby to provide a cushion for said one of said members, said conduit means including an expansible chamber, means for approaching said members to engage between them the margins of a blank, and means operable during the working stroke of said punch while said members are approached for expanding said expansible chamber whereby to relieve the pressure in the piston chamber.

4. A press comprising cooperating draw ring and drawing die members, a reciprocable drawing punch cooperating with said die member, a piston backing one of said members, means defining a chamber for said piston, conduit means for supplying fluid under pressure to said chamber whereby to provide a cushion for said one of said members, said conduit means including an expansible chamber, means for approaching said members to engage between them the margins of a blank, means for driving said punch in its working stroke, and means operated by said driving means while said members are approached to expand said expansible chamber.

5. A press comprising cooperating draw ring and drawing die members, a reciprocable drawing punch cooperating with said die member, a piston backing one of said members, means defining a chamber for said piston, conduit means for supplying fluid under pressure to said chamber whereby to provide a cushion for said one of said members, a normally open valve in said conduit means, an expansible chamber in said conduit means between said valve and said piston chamber, means for approaching said members to engage between them the margins of a blank, and means operable during the working stroke of said punch while said members are approached for closing said valve and for expanding said expansible chamber.

6. Apparatus according to claim 5 wherein said expansible chamber is defined in part by a piston which is moved to expand said expansible chamber, and wherein said valve comprises a movable element which follows the movement of said last-mentioned piston.

7. A press comprising a frame, a fixed bolster plate on said frame, a slide guided by said frame for movements toward and away from said plate, and means for moving said slide comprising a toggle, a lever, a link connecting said toggle and lever, means for swinging said lever back and forth whereby said toggle is alternately relatively straightened through said link to move said slide in a working stroke and collapsed to return said slide, said link being subjected to direct lengthwise stress during said working stroke, said link comprising aligned portions, and means holding said portions together against relative longitudinal displacement under normal conditions of stress, but releasing under abnormal conditions to permit relative longitudinal displacement of said portions.

8. A press comprising a draw ring member, a drawing punch reciprocable in said ring member between upper and lower limits, a hollow drawing die member cooperative with said ring member and punch, a knock-out device reciprocable in said punch, a main shaft; and means driven from said shaft for approaching said members, for driving said punch, and for driving said knock-out device to move said device below the lower limit of said punch to clear a formed article from the latter.

9. A press comprising a frame, a pair of slides guided by said frame for movement toward and away from each other, a fixed bolster plate between said slides, a draw ring carried by said plate at one side thereof, a drawing punch in said ring and operatively connected with the slide at the other side of said plate, a hollow drawing die carried by said slide at said one side of said plate, a reciprocable knock-out member in said punch, means for moving the die-carrying slide towards said bolster plate whereby to engage a blank between the die and ring and to temporarily maintain the engaging relation of the die and ring, means for moving the punch-connected slide toward said bolster plate whereby to draw the blank while said engaging relation is maintained, and means for moving said knock-out member relative to said punch whereby to clear the formed article from said punch after the latter reaches the end of its forming stroke.

10. A press comprising a frame, a slide on said frame carrying a forming member, a toggle in connection with said slide, a link connected to the central portion of said toggle, a lever connected to said link, rotary cam means, and followers for said cam means carried by said lever and arranged to oscillate said lever whereby said link is reciprocated and straightens and collapses said toggle to reciprocate said slide, said cam means having a dwell whereby the straightened condition of the toggle is temporarily maintained.

11. A press comprising cooperating draw ring and drawing die members, a piston backing one of said members, means defining a chamber for said piston, means for supplying fluid under pressure to said chamber whereby to provide a cushion for said one of said members, drive means for operatively moving one of said members, a circuit for controlling said drive means, and a pressure responsive switch in said circuit, the drive means being operative only when said switch is closed, said switch having a pressure connection with said chamber and being arranged to open when the pressure in said chamber falls below a predetermined minimum.

12. A press comprising a frame, a fixed bolster plate supported by said frame, a draw ring supported by said plate therebeneath, a drawing punch reciprocable in said ring, means for reciprocating said punch, a slide below said plate guided by said frame for vertical reciprocation, a drawing die on said slide cooperative with said ring and punch, means for reciprocating said slide between upper and lower limits in timed relation with said punch with a dwell at said upper limit during which the drawing operation is effected, the clearance above said die being only slightly greater than the thickness of the work when the slide is in its lower limit position, said die being adapted to pass a formed article downwardly therethrough and said slide having an opening below said die through which the article is dischargeable from the press, and means for stripping the article from the punch for discharge.

13. A press comprising a frame, a fixed bolster plate supported by said frame, a draw ring supported by said plate therebeneath, a drawing punch reciprocable in said ring, means for reciprocating said punch, a slide below said plate guided by said frame for vertical reciprocation, a drawing die on said slide cooperative with said ring and punch, means for reciprocating said slide between upper and lower limits in timed relation with said punch with a dwell at said upper limit during which the drawing operation is effected, the clearance above said die being only slightly greater than the thickness of the work when the slide is in its lower limit position, said die being adapted to pass a formed article downwardly therethrough and said slide having an opening below said die through which the article is dischargeable from the press, a knock-out member axially movable in said punch, and means for moving said knock-out member at the end of the drawing operation whereby to strip the article from the punch for discharge.

14. A press comprising a frame, a fixed bolster plate supported by said frame, a draw ring supported by said plate therebeneath, a stationary cutting ring surrounding said draw ring, a drawing punch reciprocable in said draw ring, means for reciprocating said punch, a slide below said plate and guided by said frame for vertical reciprocation, a drawing die on said slide cooperative with said rings and punch, means for reciprocating said slide between upper and lower limits in timed relation with the punch with a dwell at said upper limit during which the drawing operation is effected, means for feeding strip material between the cutting ring and drawing die when said slide is at its lower limit, the space between said cutting ring and die being only slightly greater than the thickness of the sheet material when the slide is in its lower limit position, said die being adapted to pass a formed article downwardly therethrough and said slide having an opening below said die through which the article is dischargeable from the press, and means for stripping the article from the punch for discharge.

15. A press comprising a frame, a fixed bolster plate supported by said frame, a draw ring supported by said plate therebeneath, a stationary cutting ring surrounding said draw ring, a drawing punch reciprocable in said draw ring, means for reciprocating said punch, a slide below said plate and guided by said frame for vertical reciprocation, a drawing die on said slide cooperative with said rings and punch, means for reciprocating said slide between upper and lower limits in timed relation with the punch with a dwell at said upper limit during which the drawing operation is effected, means for feeding strip material between the cutting ring and drawing die when said slide is at its lower limit, the space between said cutting ring and die being only slightly greater than the thickness of the sheet material when the slide is in its lower limit position, said die being adapted to pass a formed article downwardly therethrough and said slide having an opening below said die through which the article is dischargeable from the press, a knock-out member axially movable in said punch, and means for moving said knock-out member at the end of the drawing operation whereby to strip the article from the punch for discharge.

16. A press comprising a frame, a fixed bolster plate supported by said frame, a draw ring on the underside of said plate, an upper slide above said plate guided by said frame for vertical reciprocation, a punch carried by said slide and working in said ring, a rock shaft journalled in the base portion of said frame, parallel arms fixed on said shaft, links connecting said arms and said slide, a lower slide below said plate guided by said frame for vertical reciprocation, a drawing die on said lower slide cooperative with said ring and punch, a rotary shaft journaled in the base portion of said frame, means for rocking said rock shaft including cam means on said rotary shaft and cooperating follower means carried by said rock shaft; and means for reciprocating said lower slide including cam means on said rotary shaft, cooperating follower means for the last-named cam means, and transmission means between the last mentioned follower means and said lower slide.

17. A press according to claim 16 wherein the drawing die is hollow, wherein a knock-out member is reciprocable in said punch, and wherein means are provided driven from said rotary shaft to move the knock-out member to clear the punch after the punch reaches the end of its forming stroke.

18. A press comprising a frame, a bolster plate carried by said frame, a draw ring on the underside of said plate, a slide above said plate guided for vertical reciprocation by said frame, a drawing punch guided by said slide and reciprocable in said ring, a hollow drawing die member cooperative with said ring and punch, a knockout device reciprocable in said punch; and means for driving said knock-out device comprising a rock shaft journaled on said slide, a rock shaft journaled on said frame, arms on said rock shafts respectively, a link connecting said arms, and means for periodically rocking the rock shaft journaled on the frame.

19. A press comprising a frame, a fixed bolster plate on said frame, a slide guided by said frame for movement toward and away from said plate, a thrust nut journaled in said slide and having a worm wheel fixed thereto, a screw engaged in said nut, means for axially reciprocating the screw and for holding it against rotation, a worm journaled on said slide and engaging said worm wheel, reversible power means on said frame, and a self-adjusting drive connection between said power means and said worm.

20. A press comprising a frame, a fixed bolster on said frame, a slide guided by said frame for movement toward and away from said plate, a thrust nut journaled in said slide and having a worm wheel fixed thereto, a screw engaged in said nut, means for axially reciprocating the screw and for holding it against rotation, said means including a toggle bearing at one end against an end of said screw and at the other end against a fixed abutment, a worm journaled on said slide and engaging said worm wheel, reversible power means on said frame, and a self-adjusting drive connection between said power means and said worm.

21. A press comprising a punch, means for guiding said punch substantially rectilinearly, a rectilinearly reciprocable slide, thrust means between said slide and punch comprising a link connecting the two and being capable of universal tilting relative to each, said link having an axial bore, a knock-out member movable in said punch, and an operating rod for said member extending with clearance through said bore.

22. A press comprising a reciprocable drawing punch, means for guiding the punch rectilinearly, a slide to the rear of the punch, means for reciprocating the slide rectilinearly on the same line as the punch, and means for transmitting movement of the slide to the punch including a double ball joint connection between the slide and punch.

23. A press comprising a reciprocable drawing punch, means for guiding the punch rectilinearly, a slide to the rear of the punch, means for reciprocating the slide rectilinearly on the same line as the punch, means for transmitting movement of the slide to the punch including a double ball joint connection between the slide and punch, a knock-out member movable in said punch, and means for reciprocating said member including a rod passed with clearance through said connection.

24. A press comprising a reciprocable drawing punch, means for guiding the punch rectilinearly, a slide to the rear of the punch, means for reciprocating the slide rectilinearly on the same line as the punch, and means for transmitting movement of the slide to the punch comprising a link having a ball head at each end and bearings for said heads in connection with the slide and punch respectively.

25. A press comprising a reciprocable drawing punch, means for guiding the punch rectilinearly, a slide to the rear of the punch, means for reciprocating the slide rectilinearly on the same line as the punch, and thrust means between said slide and punch capable of universal tilting relative to each.

26. A draw and cutter ring assembly for presses, comprising a member having an annular groove, an annular piston in said groove, a retainer ring for said piston secured to said member, a cutting ring secured to said retainer ring, and a reciprocable draw ring guided in said cutting ring having a portion engaged by said piston inwardly of said retainer ring, and means for yieldingly forcing said piston against said retainer ring.

27. A press comprising a bolster plate, a draw ring supported by said plate therebeneath, means yieldingly backing said draw ring, a cutting ring surrounding said draw ring and having an inner cutting edge, a drawing die cooperable with said draw ring and having an outer cutting edge cooperable with the cutting edge of said cutting ring, means for moving said rings and die together and apart with a dwell when moved together, said rings and die acting to cut a blank and clamp the margin thereof when moved together, a punch reciprocable in said draw ring and cooperable with said die, and means for imparting a working stroke to said punch during said dwell.

28. A press comprising a frame, a fixed bolster plate supported by said frame, a draw ring supported by said plate therebeneath, a drawing punch reciprocable in said ring, means for reciprocating said punch, a slide below said plate guided by said frame for vertical reciprocation, a drawing die on said slide cooperative with said ring and punch, means for reciprocating said slide between upper and lower limits in timed relation with said punch with a dwell at said upper limit during which the drawing operation is effected, said die being adapted to pass a formed article downwardly therethrough and said slide having an opening below said die through which the article is dischargeable from the press, the clearance above said die when the slide is in its lower limit position being insufficient to permit the removal of a formed article back through it, and means for stripping the article from the punch for discharge.

29. A press comprising a frame, a fixed bolster plate supported by said frame, a draw ring supported by said plate therebeneath, a stationary cutting ring surrounding said draw ring, a drawing punch reciprocable in said draw ring, means for reciprocating said punch, a slide below said plate and guided by said frame for vertical reciprocation, a drawing die on said slide cooperative with said rings and punch, means for reciprocating said slide between upper and lower limits in timed relation with the punch with a dwell at said upper limit during which the drawing operation is effected, means for feeding strip material between the cutting ring and drawing die when said slide is at its lower limit, said die being adapted to pass a formed article downwardly therethrough and said slide having an opening below said die through which the article is dischargeable from the press, the clearance above said die when the slide is in its lower limit position being insufficient to permit the removal of a formed article back through it, and means for stripping the article from the punch for discharge.

30. A press comprising a drawing punch vertically reciprocable between upper and lower limits, a drawing die cooperable with said punch, knock-out means comprising a head at the lower end of the punch and a rod secured to said head and reciprocable in an axial bore of said punch, means for reciprocating said punch, said knock-out means being carried downwardly by the punch in its movement to lower limit position, means operated when the punch reaches said lower limit to project said knock-out means downwardly relative to the punch, and means conditioned to return said knock-out means relative to said punch during the upward movement of the latter.

31. A press comprising a drawing punch vertically reciprocable between upper and lower limits, a drawing die cooperable with said punch, knock-out means comprising a head at the lower end of the punch and a rod secured to said head and reciprocable in an axial bore of said punch, said rod extending upwardly beyond said punch, means normally yieldingly maintaining said head against said punch but permitting downward movement of the knock-out means with the punch and relative to the punch when the latter reaches its lower limit, a main shaft, means driven from said shaft for reciprocating the punch, and means between said shaft and the upper end of said rod for moving said knock-out means downwardly when the punch reaches its lower limit.

32. A press comprising a frame, a slide guided by said frame for vertical reciprocation, a punch carried by said slide, a drawing die positioned by said frame for cooperation with said punch, knock-out means comprising a head at the lower end of said punch and a rod secured to said head and reciprocable in an axial bore of said punch, means for reciprocating said punch, and means for projecting said knock-out means downwardly relative to said punch when the latter reaches its lower limit; said projecting means comprising a driving member mounted on said frame, a driven member on said slide and in connection with said rod, and a link connecting said driving and driven members.

AMOS CALLESON.
EDGAR A. CALLESON.